United States Patent [19]

Aoki

[11] 4,431,398
[45] Feb. 14, 1984

[54] APPARATUS FOR ADJUSTING THE TEMPERATURE OF A PARISON FOR STRETCH BLOW MOLDING

[76] Inventor: Katashi Aoki, 6037 Ohazaminamijo, Sakakimachi, Hanishina-gun, Nagano-ken, Japan

[21] Appl. No.: 412,393

[22] Filed: Aug. 30, 1982

Related U.S. Application Data

[63] Continuation of Ser. No. 214,453, Dec. 8, 1980, abandoned.

[51] Int. Cl.³ .................. B29C 25/00; B29C 17/07
[52] U.S. Cl. .................. 425/446; 219/343; 219/352; 219/417; 264/521; 264/535; 425/525; 425/526
[58] Field of Search .............. 425/525, 526, 529, 445, 425/446; 264/521, 532, 535; 219/342, 343, 352, 353, 415, 417

[56] References Cited

U.S. PATENT DOCUMENTS 3,191,225 6/1965 Polka .................. 425/526
4,233,022 11/1980 Brady et al. .................. 425/446 X

FOREIGN PATENT DOCUMENTS 51-77661 7/1976 Japan .................. 425/526
483917 2/1970 Switzerland .................. 425/526

Primary Examiner—Jan H. Silbaugh
Attorney, Agent, or Firm—Charles E. Pfund

[57] ABSTRACT

A method of heating a parison neck by stretching blow molding, wherein an injection molded synthetic resin parison is adjusted in temperature while holding a parison neck, by a neck mold for molding a parison neck, after which the parison is stretched and expanded to form a container such as a bottle, the method comprising at the time of adjusting temperature of said parison, heating a lower end of the neck mold and applying heat enough to prevent formation of an annular constriction in a molded product, to a border between a parison neck covered by the neck mold through the end of said neck mold and a body.

6 Claims, 5 Drawing Figures

APPARATUS FOR ADJUSTING THE TEMPERATURE OF A PARISON FOR STRETCH BLOW MOLDING

This is a continuation of application Ser. No. 214,453 filed Dec. 8, 1980, now abandoned.

OBJECT OF THE INVENTION

It is an object of the present invention to provide an apparatus for adjusting the temperature of a parison which can, simultaneously with the adjustment of the temperature of the parison, heat also a border between a part of the parison neck held on a neck mold, that is, a main portion of the parison subjected to stretch blow molding and the parison neck.

BRIEF DESCRIPTION OF THE DRAWINGS

FIG. 1 (II) is a longitudinal sectional view of an upper portion of a molded bottle.

DETAILED DESCRIPTION OF THE INVENTION

In case where bottles and hollow molded products are manufactured by stretching blow molding, there involves a disadvantage that an annular constriction is produced in a border between a neck and a body depending on the shape and wall thickness of the neck of the molded products. This annular constriction is produced due to a temperature difference between a neck molded by the neck mold and held in that condition and a body subjected to secondary heating by means of a temperature adjusting device, and because a portion in contact with the end of the neck mold of a parison is not sufficiently stretched.

Figure 1:
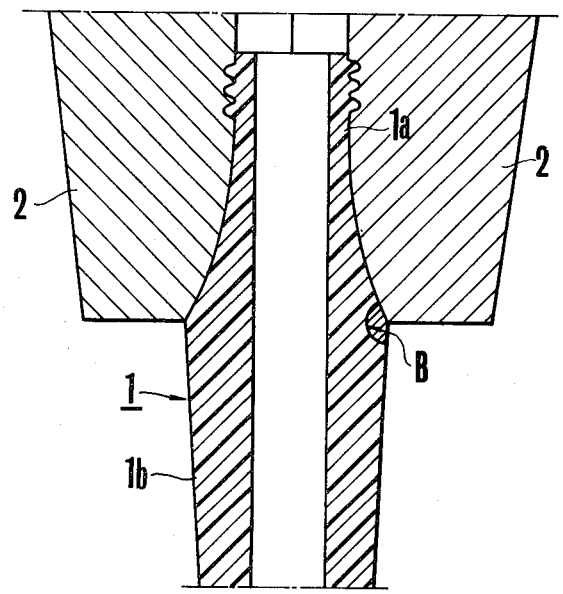
FIG. 1 (I) is a longitudinal sectional view of a parison neck and a neck mold for explanation of phenomenon produced when the parison is subjected to stretching blow molding.
Figure 1:
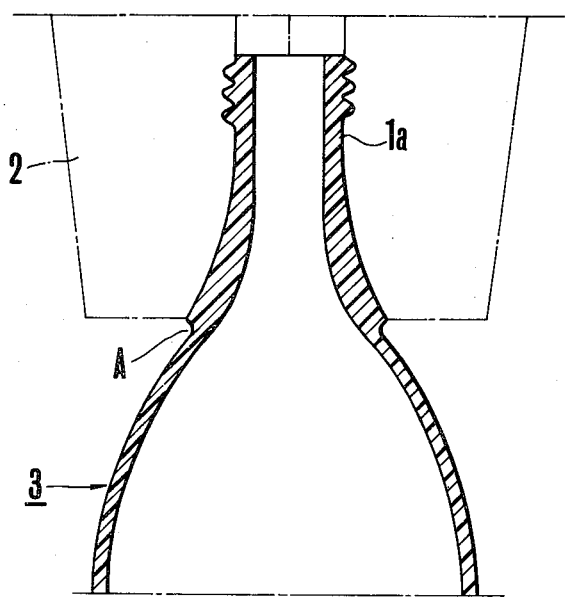

More specifically, as shown in FIG. 1, in the molding method of this type, an upper portion 1a of a parison 1 is normally in a state where the upper portion 1a is held by a neck mold 2 which opens and closes to left and right, the parison 1 is transferred together with the neck mold 2 to a temperature adjusting device, and a body 1b is inserted into the temperature adjusting device for secondary heating. Thereafter, in the blow molding mold, a portion to be adjusted in temperature is stretched and blow molded to form a hollow molded product 3 such as a bottle.

In this case, an annular constriction A shown in FIG. 1 (II) is almost always produced in a portion close to the lower opening of the neck mold 2. The present inventor has measured a temperature distribution of the body 1b after adjustment of temperature and found that a portion upwardly of a part of approximately 1.5 mm from the lower surface of the neck mold 2 greatly decreases, which is not suitable for stretching blow molding. It is considered that such decrease in temperature is due to the presence of the neck mold 2. A temperature in portion close to the neck mold 2 escapes towards the low neck mold 2 due to the temperature difference so that an area of radius B (approximately 1.5 mm) as shown including a portion exposed from the neck mold 2 lowers in temperature.

From the above-mentioned reasons, an attempt has been made to apply heat insulation to the circumference of a lower opening of the neck mold to prevent the lowering of temperature in said portion before stretching blow molding is taken place, and as a consequence, an annular constriction A was not produced but a sore-like portion was newly produced in a portion in contact with the heat insulating material due to poor cooling.

It is an object of this invention is to provide a method of heating the circumference of a lower opening of the neck mold 2 so as not to produce the above-mentioned annular constriction A and not to produce a sore-like portion due to overheating.

It is another object of the invention is to provide a method of heating a parison neck in which a lower end of a neck mold is heated to a predetermined temperature by contact thereof with a heating body to prevent escape of heat from a neck of a parison in contact with the circumference of a lower opening and avoid formation of an annular constriction in a molded product by stretching blow molding due to the lowering of temperature as encountered in the prior art, and since partial heating is applied to the neck mold, the product is easily cooled after stretching blow molding and heat is rarely accumulated thereby producing no sore-like portion in the surface of a parison neck due to overheating.

It is a further object of this invention is to provide an method of heating a parison neck in which a heating body is disposed in a temperature adjusting device of parison to effect heating of the parison neck continuous to the temperature adjustment of the parison, and which affords advantages that the method can be applied even to conventional stretching blow molding because of a simple construction in which the heating body is merely mounted on the temperature adjusting device.

Figure 2:
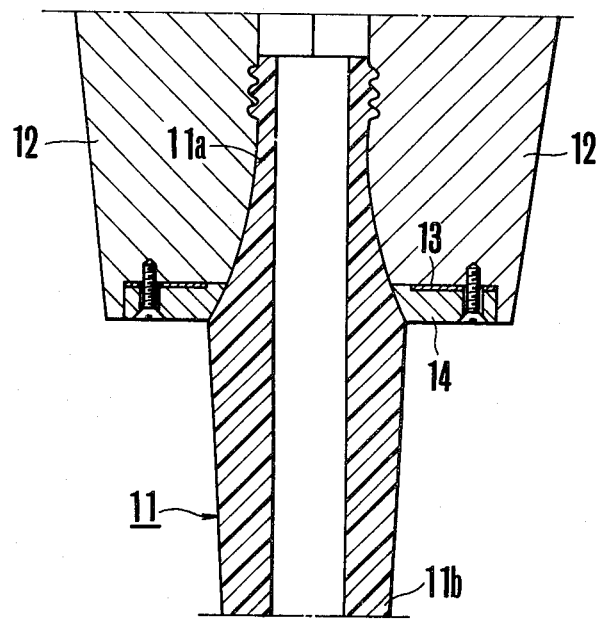
FIG. 2 is a longitudinal sectional view of a neck mold and a parison neck used in this invention.
Figure 3:
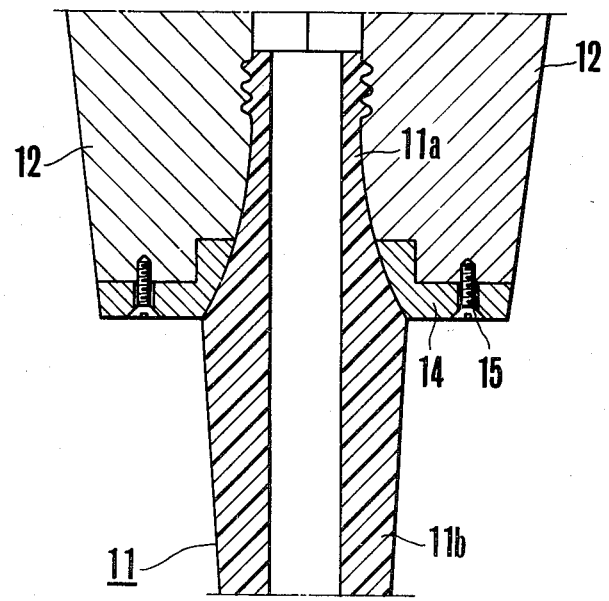
FIG. 3 is a longitudinal sectional view of a parison neck and a neck mold showing another embodiment of a lower end portion of the neck mold.
Figure 4:
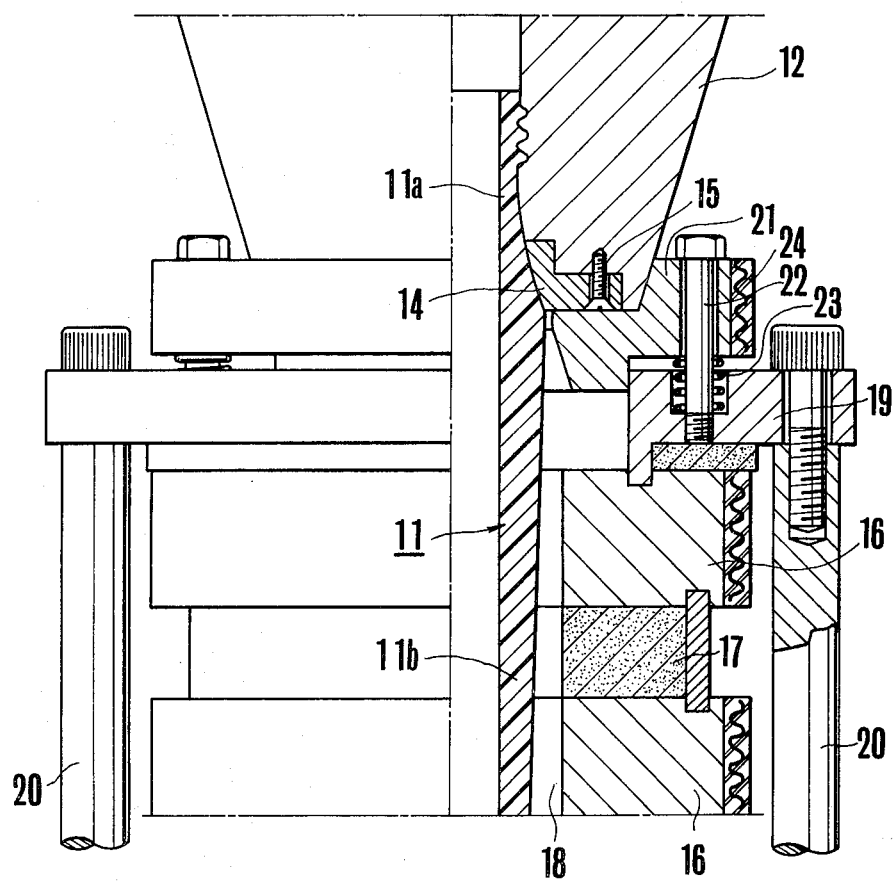
FIG. 4 is a partial view in longitudinal section showing the lower end portion of the neck mold and a heating means above a heating device with the lower end portion of the neck mold placed in contact therewith.

Referring to FIGS. 2 to 4, reference numeral 11 designates a parison, and 12 designates a neck mold. A parison neck 11a forming an upper part of a hollow molded product is held in close contact with the neck mold 12 similar to the case of the above-mentioned prior art, and a body 11b is projected from the lower surface of the neck mold.

The circumference of a lower opening of the neck mold 12 is formed from a heating member 14 of metal material which is fitted through a thin layer of a heat insulating material 13 (for example, heat insulating paper) and fixed by means of screws 15, said heating member 14 having the desired height, and the neck 11a of the parison 11 is formed by an inner side of the heating member 14 and the inner surface of the neck mold.

It should be noted that the heat insulating material 13 may be removed as the case may be. The reason is that this heat insulating material 13 is provided to prevent the whole neck mold from being heated by repetitive heating, and the heat insulating material 13 is not particularly provided to act on and heat the parison neck 11a.

Also, the neck mold 12 is always partly heated, and if such heating should be extended over the whole neck mold, such partly applied heat is absorbed by the neck mold and a constitutional member holding the neck mold when such heat is moved away from the heating body and there is no room that preheat remains.

Further, the heating member 14 is formed of a metal having better heat transfer than that of metal of which is formed a neck mold 12, and fitting may be accomplished directly in a state as shown in FIG. 3.

Thus, prior to transfer of the neck mold 12 to a blow molding mold, the prearranged heating body and heating member 14 are brought into contact and the circumference of a lower opening of the neck mold 12 is maintained at a suitable temperature by the heating member 14 to prevent a portion close to the lower surface of the parison 11 from being lowered in temperature.

Most preferably, application of temperature to the heating member 14 by the aforementioned heating body is effected by an adjusting device in which the body 11b of the parison 11 is subjected to secondary heating from the process of stretching blow molding, to a temperature suitable for stretching blow molding.

FIG. 4 shows a device for adjusting parison temperature in which heating elements 16 and heat insulating materials 17 are alternately stacked to form a parison inserting hole 18, and an iron fram 19 mounted on the uppermost one of said heating elements 16 is fastened to a support post 20. The heating body 21 is vertically movably mounted on the temperature adjusting device with a spring 23 being interposed in a pin 22 provided on the iron frame 19, the upper surface therof being formed so as to be fitted into the lower portion of the neck mold 12 into contact with the heating member 14, and thus, a parison is always heated at a suitable temperature by means of a heater 24 which is mounted on the outer peripheral side and can be adjusted in temperature, and in a state where the lower surface of the neck mold 12 moved down together with the parison 11 is in contact with the heating body 21, the body 11b of the parison 11 is subjected to secondary heating and at the same time, the heating member 14 applied with temperature by contact with the heating body 21 partially heats the parison neck 11a in contact with the inner surface thereof to prevent the parison in the circumference of the lower opening of the neck mold 12 from being lowered in temperature.

What is claimed is:

1. An apparatus for adjusting the temperature of a parison for stretch blow molding, which apparatus is used in the case wherein an injection molded synthetic resin parison is adjusted in temperature while holding the parison neck by a neck mold for molding the parison neck, after which the parison is stretched and expanded to form a container such as a bottle, the apparatus comprising a plurality of stacked heating and heat-insulating elements arranged alternately with a heating element at the top, said elements containing aligned holes which collectively define a vertically-elongate, parison-receiving hole, a frame member mounted on the top one of the heating elements, said frame member containing an opening concentric with the parison-receiving hole, support pins fixed to the frame member with their axis perpendicular to the frame member, spring members positioned about the support pins with their lower ends resting on the frame member and their upper ends extending above the frame member, an annular parison neck mold heating body defining an opening concentric with the opening in the frame member supported by the support pins on the upper ends of the spring members for vertical movement relative to the frame member and an adjustable heating element positioned about and in heat-transmitting engagement with the annular parison neck mold heating member.

2. Apparatus for adjusting the temperature of a parison according to claim 1 wherein said frame member is fastened by means of bolts to support posts provided externally of the apparatus body.

3. Apparatus for adjusting the temperature of a parison according to claim 1 wherein said parison neck heating body contains at its upper surface a recess within which the neck mold is received and wherein the parison neck is heated by transmission of heat from the neck mold heating member to the neck mold.

4. A device according to claim 1 wherein the neck mold contains a recess within which there is positioned a heat-conductive element having heat-conductive contact with the heating body.

5. Apparatus according to claim 1 wherein the neck mold contains an annular recess facing the heating body within which is positioned a heat-conductive ring having an annular surface in heat-conductive contact with the neck of the parison and an annular surface in heat-conductive contact with the heating body.

6. Apparatus according to claim 5 wherein the heat-conductive ring is positioned between the heating body and the neck mold and is approximately 1.5 mm in thickness.

* * * * *